United States Patent
Chen et al.

(10) Patent No.: US 8,372,558 B2
(45) Date of Patent: Feb. 12, 2013

(54) HIGHLY PROTON-CONDUCTIVE POLYMER ELECTROLYTE MEMBRANES THAT EXCEL IN MECHANICAL STRENGTH AND A PROCESS FOR PRODUCING THE SAME

(75) Inventors: Jinhua Chen, Takasaki (JP); Yasunari Maekawa, Takasaki (JP); Masaharu Asano, Takasaki (JP); Masaru Yoshida, Takasaki (JP)

(73) Assignee: Japan Atomic Energy Agency, Ibaraki (JP)

( * ) Notice: Subject to any disclaimer, the term of this patent is extended or adjusted under 35 U.S.C. 154(b) by 1209 days.

(21) Appl. No.: 12/230,103

(22) Filed: Aug. 22, 2008

(65) Prior Publication Data

US 2009/0068534 A1 Mar. 12, 2009

(30) Foreign Application Priority Data

Sep. 11, 2007 (JP) ................................. 2007-235458

(51) Int. Cl.
*H01M 8/10* (2006.01)
(52) U.S. Cl. ........ 429/493; 429/491; 429/494; 429/479; 429/480; 525/353; 525/326.1; 525/471; 525/418; 525/535; 525/417
(58) Field of Classification Search .................. 429/493, 429/491, 494, 479, 480; 525/353, 326.1, 525/471, 418, 535, 417
See application file for complete search history.

(56) References Cited

U.S. PATENT DOCUMENTS

2006/0134493 A1* 6/2006 Yoshida et al. ................. 429/33
2008/0312350 A1 12/2008 Chen et al.

FOREIGN PATENT DOCUMENTS

| GB | 2 454 140 A | 4/2009 |
|---|---|---|
| JP | 2004-288497 | 10/2004 |
| JP | 2004-346163 | 12/2004 |
| JP | 2006-12791 | 1/2006 |
| JP | 2006-282969 | 10/2006 |
| JP | 2007-115435 | 5/2007 |
| JP | 2007-141601 | 6/2007 |
| JP | 2007-234247 | * 9/2007 |
| JP | 2008-53041 | 3/2008 |
| JP | 2008-195748 | 8/2008 |
| WO | WO 2004/106622 | * 12/2004 |

* cited by examiner

*Primary Examiner* — Robert C Boyle

(57) ABSTRACT

A vinyl monomer is graft polymerized on an aromatic hydrocarbon-based polymer film substrate to introduce graft chains into the substrate and thereafter a functional monomer represented by the following formula and having sulfonic acid groups or functional groups capable of conversion to sulfonic acid groups is graft polymerized to introduce the sulfonic acid groups or the functional groups capable of conversion to sulfonic acid groups:

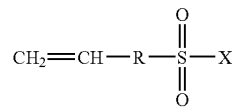

where R is an aromatic ring or an aliphatic chain; X is (1) —OH, (2) —OLi, —ONa or —OK, (3) —F or —Cl, or (4) —OC$_n$H$_{2n+1}$ where n is an integer of 1 to 7. Since the graft chains obtained by graft polymerization of the vinyl monomer can also be utilized as scaffold polymers, the graft polymerizability of the functional monomer to the aromatic hydrocarbon-based polymer film substrate is sufficiently improved to enable the preparation of a polymer electrolyte membrane that excels not only in proton conductivity and mechanical strength but also in dimensional stability.

17 Claims, No Drawings

HIGHLY PROTON-CONDUCTIVE POLYMER ELECTROLYTE MEMBRANES THAT EXCEL IN MECHANICAL STRENGTH AND A PROCESS FOR PRODUCING THE SAME

CROSS-REFERENCE TO RELATED APPLICATIONS

This application claims the benefit of Japanese Application No. 235458/2007 filed Sep. 11, 2007 in the Japanese Patent Office, the disclosure of which is incorporated herein by reference.

BACKGROUND OF THE INVENTION

The present invention relates to highly proton-conductive polymer electrolyte membranes that are suitable for use in polymer electrolyte fuel cells or in dialysis applications such as electrodialysis and diffusion dialysis and which excel in mechanical strength, as well as a process for producing such polymer electrolyte membranes.

Polymer electrolyte fuel cells have high energy density and hence hold promise for use as power supplies to household cogeneration systems, mobile communication devices and electric vehicles or as simplified auxiliary power sources. In polymer electrolyte fuel cells, a gas-diffusing electrode is composited to both sides of the polymer electrolyte membrane in such a way as to provide a substantially monolithic structure. Hence, the polymer electrolyte membrane not only acts as a proton-conducting electrolyte but also has the role of a diaphragm that prevents the fuel hydrogen or methanol from directly mixing with the oxidant oxygen even under pressure.

One of the requirements that should be satisfied by the polymer electrolyte membrane is that more protons flow. To this end, it is important that sulfonic acid groups responsible for proton conduction should be introduced as much as possible into the polymer electrolyte membrane.

The polymer electrolyte membrane which also has the role of a diaphragm must satisfy other requirements including high mechanical strength and good dimensional stability.

To meet these needs of polymer electrolyte membranes, Nafion® has been commonly used and this is the perfluorinated sulfonic acid polymer membrane developed by Du Pont. However, the Nafion® membrane has the problem that as the amount of sulfonic acid groups responsible for proton conduction is increased, the membrane liquefies, so they cannot be introduced beyond a certain limit. In addition, the membrane strength decreases with the increased introduction of the sulfonic acid groups, causing such a problem as the breakage of the membrane during assembly of a cell unit or cell operation. It has thus been a difficult task to achieve high levels for both proton conductivity and membrane strength. What is more, the Nafion® membrane is very expensive and this has been a great obstacle to the effort in commercializing the polymer electrolyte fuel cell.

Under the circumstances, efforts have been made to develop low-cost polymer electrolyte membranes that can be substituted for the Nafion® membrane. The polymer electrolyte membranes under development are generally classified into three types, fully fluorinated, partially fluorinated hydrocarbon-based, and hydrocarbon-based.

The fully fluorinated polymer electrolyte membrane is highly durable but at the same time it is very expensive. In contrast, the hydrocarbon-based polymer electrolyte membrane and the partially fluorinated hydrocarbon-based polymer electrolyte membrane can be synthesized from quite inexpensive starting materials at low cost and, hence, are expected to have a potential to supply inexpensive polymer electrolyte membranes for polymer electrolyte fuel cells.

In particular, aromatic hydrocarbon-based polymer electrolyte membranes are produced by sulfonating films of aromatic hydrocarbon-based polymers which are super-engineering plastics. Alternatively, polymer electrolyte membranes can be produced by a process which comprises synthesizing a polymer electrolyte by polymerization reaction of an aromatic hydrocarbon-based monomer to which sulfonic acid groups have bonded and then forming a membrane of the polymer (see, for example, JP. 2004-288497 A, JP 2004-346163 A, and JP 2006-12791 A). Because of the aromatic structure it possesses, the produced polymer electrolyte membrane is expected to have high enough mechanical strength. However, these aromatic hydrocarbon-based polymer electrolyte membranes have the same difficulty that the Nafion® membrane has: when more of the sulfonic acid groups responsible for proton conduction are incorporated, the membrane becomes more water-soluble and its mechanical strength decreases. This is because the sulfonic acid groups randomly present in the aromatic hydrocarbon-based polymer chains prevent sharp separation between the hydrophobic portion which contributes to the retention of mechanical strength and the electrolyte layer responsible for proton conduction.

In order to solve this problem, the present inventors previously filed Japanese Patent Application 2007-029223, proposing that a crosslinked structure be introduced by preliminary irradiation of an aromatic hydrocarbon-based polymer film. This process does not involve the membrane-forming step and yet a polymer electrolyte membrane can be obtained by direct sulfonation. A further advantage of this process is that crosslinking provides a higher ion-exchange capacity and contributes to allowing the polymer electrolyte membrane to retain high mechanical strength. However, in order to impart an effective crosslinked structure to the aromatic hydrocarbon-based polymer film substrate, radiation must be applied at a high dose ($\geqq 1000$ kGy); hence, it has been desired to impart high enough crosslinking density by a lower dose of irradiation.

Japanese Patent Application 2006-227935 proposes that a vinyl monomer having functional groups capable of conversion to sulfonic acid groups be graft polymerized to the aromatic hydrocarbon-based polymer film substrate by radiation-induced grafting. However, on account of the conversion to sulfonic acid groups, the aromatic hydrocarbon-based polymer serving as the substrate in the sulfonation step is also sulfonated, causing a considerable drop in the mechanical strength of the membrane. What is more, due to the low graft polymerizability of the aromatic hydrocarbon-based polymer film, it is difficult to obtain high enough ion-exchange capacity.

SUMMARY OF THE INVENTION

The present invention has been accomplished under these circumstances and has as an object providing a highly proton-conductive polymer electrolyte membrane that is suitable for use in polymer electrolyte fuel cells and other applications and which is rendered to excel in mechanical strength by being provided with high levels for both proton conductivity and membrane strength.

Another object of the present invention is to provide a process for producing the above-stated highly proton-conductive polymer electrolyte membrane.

Yet another object of the present invention is to provide a polymer electrolyte fuel cell that installs a polymer electrolyte membrane having the above-described superior characteristics.

The polymer electrolyte membrane according to the first aspect of the present invention is characterized in that a vinyl monomer is graft polymerized to an aromatic hydrocarbon-based polymer film substrate and thereafter a functional monomer represented by the following formula and having sulfonic acid groups or functional groups capable of conversion to sulfonic acid groups is introduced into the resulting graft chains and/or the main chains in the polymer film substrate by graft polymerization:

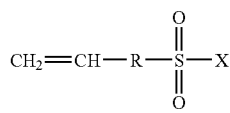

where R is an aromatic ring or an aliphatic chain; X is (1) —OH, (2) —OLi, —ONa or —OK, (3) —F or —Cl, or (4) —OC$_n$H$_{2n+1}$ where n is an integer of 1 to 7.

If desired, the vinyl monomer and/or the functional monomer may be combined with one or more polyfunctional monomers as a crosslinking agent to form a crosslinked structure.

If desired, the aromatic hydrocarbon-based polymer film substrate may be adapted to have a polyetheretherketone structure, a polyetherketone structure, a polyimide structure, a polysulfone structure, or a polybenzimidazole structure.

If desired, the graft polymerization of the vinyl monomer and the graft polymerization of the functional monomer may each be either thermal graft polymerization or radiation-initiated graft polymerization.

If desired, the degree of grafting in the graft polymerization of the vinyl monomer is from 1 to 20%, the degree of grafting in the graft polymerization of the functional monomer is from 6 to 80%, and the ion-exchange capacity is from 0.5 to 3.0 meq/g.

The process for producing a polymer electrolyte membrane according to the second aspect of the present invention is characterized by having the first graft polymerization step in which a vinyl monomer is graft polymerized to an aromatic hydrocarbon-based polymer film substrate and the second graft polymerization step in which a functional monomer represented by the following formula and having sulfonic acid groups or functional groups capable of conversion to sulfonic acid groups is graft polymerized to the graft chains obtained by the first graft polymerization step and/or the main chains in the polymer film substrate:

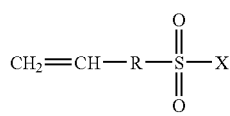

where R is an aromatic ring or an aliphatic chain; X is (1) —OH, (2) —OLi, —ONa or —OK, (3) —F or —Cl, or (4) —OC$_n$H$_{2n+1}$ where n is an integer of 1 to 7.

The polymer electrolyte fuel cell according to the third aspect of the present invention is characterized in that either one of the polymer electrolyte membranes described above is provided between two gas-diffusing electrodes.

In the polymer electrolyte membrane according to the first aspect of the present invention, the graft chains obtained by graft polymerization of the vinyl monomer to the aromatic hydrocarbon-based polymer film substrate can also be utilized as "scaffold polymers" in the process of graft polymerizing the functional monomer having sulfonic acid groups or functional groups capable of conversion to sulfonic acid groups; hence, the low graft polymerizability of the functional monomer to the aromatic hydrocarbon-based polymer film substrate can be effectively improved to allow the functional monomer to be graft polymerized with high degree of grafting. As a result, one can produce a grafted, aromatic hydrocarbon-based polymer electrolyte membrane that contains a greater number of sulfonic acid groups and which excels in proton conductivity and mechanical strength. The high mechanical strength leads to better dimensional stability. In particular, the membrane can advantageously be used in polymer electrolyte fuel cells.

The process for producing a polymer electrolyte membrane according to the second aspect of the present invention is characterized by having the first graft polymerization step in which the vinyl monomer is graft polymerized to the aromatic hydrocarbon-based polymer film substrate and the second graft polymerization step in which the functional monomer having sulfonic acid groups or functional groups capable of conversion to sulfonic acid groups is graft polymerized to the graft chains obtained by the first graft polymerization step and/or the main chain in the polymer film substrate; hence, the low graft polymerizability of the functional monomer to the aromatic hydrocarbon-based polymer film substrate can be effectively improved to ensure that a polymer electrolyte membrane having high proton conductivity and mechanical strength, in particular, one suitable for use in polymer electrolyte fuel cells can be produced at low enough cost.

In the polymer electrolyte fuel cell according to the third aspect of the present invention, the above-described polymer electrolyte membrane is provided between two gas-diffusing electrodes, so the fuel cell excels in proton conductivity and mechanical strength. As a further advantage, the polymer electrolyte fuel cell according to the third aspect of the present invention in which the polymer electrolyte membrane that is adapted to excel in both proton conductivity and mechanical strength is provided between the gas-diffusing electrodes is long-lived and produces higher output.

DETAILED DESCRIPTION OF THE INVENTION

The polymer electrolyte membrane according to the first aspect of the present invention is characterized in that a vinyl monomer is graft polymerized to an aromatic hydrocarbon-based polymer film substrate and thereafter a functional monomer represented by the following formula and having sulfonic acid groups or functional groups capable of conversion to sulfonic acid groups is introduced into the resulting graft chains and/or the main chains in the polymer film substrate (i.e., an aromatic polymer chain) by graft polymerization:

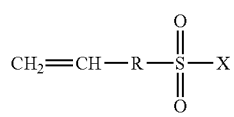

where R is an aromatic ring or an aliphatic chain; X is (1) —OH, (2) —OLi, —ONa or —OK, (3) —F or —Cl, or (4) —OC$_n$H$_{2n+1}$ where n is an integer of 1 to 7.

To prepare this polymer electrolyte membrane of the present invention, the tough aromatic hydrocarbon-based polymer film substrate which is a engineering plastic is subjected to the first graft polymerization step in which the vinyl monomer is graft polymerized so that it is introduced as "scaffold polymers" (graft chains) and subsequently in the second graft polymerization step, the functional monomer represented by the above formula and having sulfonic acid groups or functional groups capable of conversion to sulfonic acid groups is graft polymerized to the graft chains obtained by the first graft polymerization step and/or the main chains in the polymer film substrate; as a result, the functional monomer is graft polymerized as side chains to the scaffold polymers and/or the polymer's main chains in the substrate. If necessary, protonation or hydrolytic treatment may be performed to prepare a polymer electrolyte membrane that satisfies both requirements for higher mechanical strength and high proton conductivity.

In order to fully exploit the characteristics of the aromatic hydrocarbon-based polymer film substrate which is a super-engineering plastic that excels in mechanical strength, it was necessary to avoid the drop in the mechanical characteristics of the base that would result from the conventional step of sulfonation with conc. sulfuric acid, chlorosulfonic acid or fuming sulfuric acid; hence, the present inventors made such attempts that functional monomers having sulfonic acid groups or functional groups capable of conversion to sulfonic acid groups as by hydrolysis were grafted to the film substrate. As it turned out, however, the tested functional monomers had only low graft polymerizability to the aromatic hydrocarbon-based polymer film substrate, so it was found to be difficult to synthesize an electrolyte membrane having high ion-exchange capacity. Hence, as described above, using the aromatic hydrocarbon-based polymer film as the engineering plastic substrate, the present inventors performed the first graft polymerization step, in which the vinyl monomer was graft polymerized as multidimensional, say, two-dimensional main chains onto the polymer's main chains in the substrate so as to form scaffold polymers (graft chains) and the inventors subsequent performed the second graft polymerization step, in which the functional monomer represented by the following formula and which had sulfonic acid groups or functional groups capable of conversion to sulfonic acid groups were graft polymerized as side chains to the above-mentioned scaffold polymers and/or the polymer's main chains in the substrate:

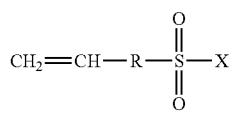

where R is an aromatic ring or an aliphatic chain; X is (1) —OH, (2) —OLi, —ONa or —OK, (3) —F or —Cl, or (4) —OC$_n$H$_{2n+1}$ where n is an integer of 1 to 7.

To be more specific, the vinyl monomer is subjected to graft reaction with the polymer's main chains in the substrate in the first graft polymerization step and the resulting graft chains can be utilized as scaffold polymers for grafting in the second graft polymerization step; hence, the low graft polymerizability to the aromatic hydrocarbon-based polymer film substrate of the functional monomer having sulfonic acid groups or functional groups capable of conversion to sulfonic groups can be effectively improved to allow the functional monomer to be graft polymerized with high degree of grafting. As a result, a grafted, aromatic hydrocarbon-based polymer electrolyte membrane that contains a greater number of sulfonic acid groups is obtained. The present invention is described below in detail.

(Graft Polymerization)

The graft polymerization to be performed in the present invention is not limited to any particular mode and examples include thermal graft polymerization and radiation-induced graft polymerization.

(Thermal Graft Polymerization)

In the case of thermal graft polymerization, the polymer film substrate is preferably immersed in a monomer solution and subjected to polymerization reaction in the air or in an inert atmosphere such as nitrogen at 40-100° C., particularly at 50-80° C., for 1-48 hours, particularly for 5-20 hours. Since the aromatic ring in the aromatic hydrocarbon-based polymer has high radical-trapping ability, the thermally generated radicals are trapped by the aromatic rings in the substrate and branch-like graft chains are formed on the polymer chains in the substrate to serve as start points for graft polymerization.

Thermal graft polymerization is preferred since it can be effected by a simple process at low cost. However, the amount of radicals that are generated by heat is so small that it is difficult to achieve 20% or more as a degree of grafting. In the present invention, thermal graft polymerization is more preferred for the first graft polymerization step in which the vinyl monomer is graft polymerized to the aromatic hydrocarbon-based polymer film substrate and this is for the following two reasons: the required degree of grafting is low; and it is possible to choose monomers that have high reactivity for grafting.

(Radiation-Induced Graft Polymerization)

In the case of radiation-induced graft polymerization, irradiation causes radicals to be generated on the polymer film substrate and these radicals are brought into contact with the vinyl monomer, whereupon graft chains are formed. Since the amount of radicals generation can be controlled by the dose of radiation, high degree of grafting can preferably be obtained. In the present invention, the second graft polymerization step in which the functional monomer having sulfonic acid groups or functional groups capable of conversion to sulfonic acid groups is graft polymerized requires a higher degree of grafting than the already-mentioned first graft polymerization step and in this second graft polymerization step, it is more preferred to use radiation-induced graft polymerization which can attain high degree of grafting.

Graft polymerization of the monomer to the starting polymer film substrate or the polymer film substrate on which graft chains have been formed by the first graft polymerization step may be performed by "pre-irradiation" where the substrate per se or the polymer film substrate on which graft chains have been formed is reacted with the monomer after irradiation, or by "simultaneous irradiation" where the substrate and the monomer, or the polymer film substrate on which graft chains have been formed and the monomer, are simultaneously irradiated to get the monomer to be reacted. Pre-irradiation is preferred since it generates a smaller amount of homopolymer.

Pre-irradiation may be performed by the polymer radical method in which the polymer film substrate (including the case where graft chains have been formed on it and this may apply hereinafter) is irradiated in an inert gas or the peroxide method in which the substrate is irradiated in the presence of oxygen. Either method may be adopted. In one example of the pre-irradiation process, the polymer film substrate is first inserted into a glass vessel or the like and the vessel is evacuated and refilled with an inert gas. Thereafter, the vessel containing the substrate is irradiated at a temperature of −10° C. to 80° C., preferably near room temperature, and then the monomer solution is charged into the vessel containing the irradiated substrate and subjected to graft polymerization.

If the dose of irradiation is less than 1 kGy, graft chains will not be adequately formed. Hence, the dose of irradiation is generally at least 1 kGy, preferably at least 5 kGy, and more preferably at least 10 kGy. On the other hand, if the dose of irradiation is unduly high, the cost of irradiation increases and, what is more, the substrate polymer breaks and becomes too brittle to withstand use in polymer electrolyte fuel cells. Therefore, the does of irradiation generally does not exceed 500 kGy, preferably not exceed 100 kGy, and more preferably not exceed 60 kGy.

The kind of radiation to be applied is not limited in any particular way and may be exemplified by γ-rays, X-rays, electron beams, ion beams, ultraviolet light, etc. Due to the ease with which radicals are generated, γ-rays and electron beams are preferred.

Contact between the polymer film substrate and the monomer solution is typically effected in vacuo, in an inert gas atmosphere, or in the air. However, in order to ensure that graft chains are adequately formed, it is necessary to prevent radicals from being inactivated by oxygen and to this end the operation is preferably performed in vacuo or in an inert gas atmosphere. In the present invention, the oxygen concentration in the reaction atmosphere during graft polymerization is preferably adjusted to 0.01% or below (% is by volume and this may apply hereinafter). If the oxygen concentration exceeds 0.01%, the graft polymerizability may occasionally drop. Examples of the inert gas that can be used include nitrogen and argon.

(Graft Polymerization Temperature and Time)

To obtain an appropriate graft polymerization rate, a graft polymerization temperature of 40° C. or more is preferred. In order to prevent the formation of a homopolymer and the inactivation of radicals, a graft polymerization temperature of not more than 100° C. is preferred. The graft polymerization time is preferably from 1 to 40 hours, with the range of 4 to 20 hours being particularly preferred.

(Solvent for Graft Polymerization)

In order to suppress the generation of a homopolymer, the monomer is preferably used as diluted with a solvent. The solvent for diluting the monomer is not limited in any particular way and a suitable solvent may be appropriately chosen from among the following: ethers such as dioxane and tetrahydrofuran; hydrocarbons such as toluene and hexane; alcohols such as methanol, ethanol and isopropyl alcohol; ketones such as acetone, methyl isopropyl ketone, and cyclohexanone; esters such as ethyl acetate and butyl acetate; and nitrogen-containing compounds such as isopropylamine, diethanolamine, N-methylformamide, and N,N-dimethylformamide. If a solvent is to be used, the monomer concentration is not limited to any particular value and the range from 20 to 80 vol % is usually preferred.

As described above, the first graft polymerization step and/or the second graft polymerization step in the present invention is performed by, for example, thermal graft polymerization which involves heating the substrate in the monomer solution, or radiation-induced graft polymerization (pre-irradiation) which involves preliminarily irradiating the substrate and heating the irradiated substrate in a vinyl monomer solution, or graft polymerization (simultaneous irradiation) which involves irradiation of the substrate as it is kept in contact with the vinyl monomer solution. To be more specific, by the first and second graft polymerization steps, the vinyl monomer and the functional monomer are bound chemically as graft chains to the polymer chains in the substrate, thus contributing high stability to the polymer electrolyte membrane. In addition, whether thermal graft polymerization or radiation-induced graft polymerization is employed, grafting progresses uniformly into the interior of the aromatic hydrocarbon-based polymer film substrate and, hence, the entire part of the resulting polymer electrolyte membrane is expected to have high proton conductivity. As a further advantage, each of the thermal and radiation-induced graft polymerization procedures is a convenient polymerization process that has already been established in the industry to allow for straightforward application.

(Structure of the Polymer Electrolyte Membrane)
(Substrate for the Polymer Electrolyte Membrane)

The substrate that can be used in the present invention is not limited in any particular way as long as it is an aromatic hydrocarbon-based polymer film which is in the class of so-called "super-engineering plastics." Exemplary aromatic hydrocarbon-based polymer film substrates that can be used include polyetheretherketone, polyethylene naphthalate, polycarbonate, polyetherketone, polyethersulfone, polyphenylenesulfide, and polysulfone, as well as polyimide-based polymer films such as polyimide, polyetherimide, polyamideimide, polybenzimidazole, and polyetheretherimide. Among these examples, aromatic hydrocarbon-based polymer film substrates having the polyetheretherketone structure, the polyetherketone structure, the polyimide structure, the polysulfone structure, or the polybenzimidazole structure are preferred. Using these film substrates, one can produce polymer electrolyte membranes that retain unchanged the outstanding mechanical, thermal and chemical characteristics of the aromatic hydrocarbon-based polymer films which are in the class of super-engineering plastics. Among these film substrates, the polyetheretherketone film is particularly preferred.

(Thickness of the Substrate)

The thickness of the polymer film which can be used as the substrate in the present invention is not limited to any particular value but it is preferably from 10 to 200 μm. If the substrate is thinner than 10 μm, the resulting electrolyte membrane has a decreased strength; if it is thicker than 200 μm, the resulting electrolyte membrane presents an increased resistance and the polymer electrolyte fuel cell it uses has such a general tendency that it fails to have the required characteristics. For these reasons, the substrate may be adjusted to have an appropriate thickness between 10 and 200 μm with a view to achieving adequate strength and high proton conducting performance.

(First Graft Polymerization Step and the Introduction of Scaffold Polymers)

In the first graft polymerization step of the present invention, the vinyl monomer is grafted as scaffold polymers to the polymer's main chains in the substrate. The grafted scaffold polymers (graft chains) work as scaffolds for graft polymerizing the functional monomer in the second graft polymerization step to be described later.

In the present invention, scaffold polymers (graft chains) may typically be obtained by graft polymerizing the vinyl monomer to the aforementioned substrate using a radiation. The vinyl monomer may be of a single species or alternatively, plural species of vinyl monomer may be used in admixture. The vinyl monomer that can be used is not limited in any particular way as long as it can be grafted to the polymer's main chains. Exemplary vinyl monomers that can be used may be represented by the general formula $CH_2=CXR$, where X is H, OH, F, Cl or a hydrocarbon, and R is a hydrocarbon or a derivative thereof. Examples of R include hydrocarbons having an aromatic ring, and hydrocarbons having a carbonyl group, an amide group, or the like. Specific examples of the vinyl monomer include styrene or its derivatives, acrylic acid or its derivatives, acrylamides, vinylketones, acrylonitriles, fluorine-containing vinyl monomers, and polyfunctional monomers thereof such as polyfunctional vinyl monomers.

The polyfunctional (polyfunctional group having) vinyl monomers have the advantages of high polymerizability in thermal graft polymerization, the ability to impart a crosslinked structure between polymer's main chains, and the ability of unreacted vinyl groups to promote graft polymerization of the functional monomer in the second graft polymerization step. Applicable polyfunctional (polyfunctional group having) vinyl monomers include divinylbenzene, bisvinylphenylethane, 2,4,6-triallyloxy-1,3,5-triazine, triallyl-1,2,4-benzenetricarboxylate, triallyl-1,3,5-triazine-2,4,6-trione, divinylsulfone, ethylene glycol divinyl ether, diethylene glycol divinyl ether, triethylene glycol divinyl ether, cyclohexane dimethanol divinyl ether, phenylacetylene, diphenylacetylene, 1,4-diphenyl-1,3-butadiene, diallyl ether, butadiene, isobutene, etc.

In order to ensure that the electrolyte membrane of the present invention does not deteriorate in mechanical strength, the degree of grafting of the vinyl monomer to be achieved in the first graft polymerization step is preferably adjusted to 20% or less, more preferably to 15% or less. In order to ensure that the grafted vinyl monomer will work satisfactorily as scaffolds for the graft polymerization of the functional monomer in the second graft polymerization step, the degree of grafting is generally adjusted to 3% or more, preferably 8% or more.

(Second Graft Polymerization Step and the Introduction of Functional Side Chains)

In the second graft polymerization step of the present invention, the functional monomer having sulfonic acid groups or functional groups capable of conversion to sulfonic acid groups is grafted as side chains to the polymer film to which the scaffold polymers have been grafted. Depending on the need, protonation with an acid or hydrolysis may subsequently be performed to yield the polymer electrolyte membrane.

(Functional Monomer)

The functional monomer that can be used in the present invention has the structure that is represented by the chemical formula:

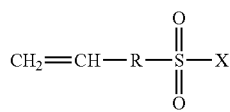

where R is an aromatic ring or an aliphatic chain; X is (1) —OH, (2) —OLi, —ONa or —OK, (3) —F or —Cl, or (4) —$OC_nH_{2n+1}$ where n is an integer of 1 to 7.

More preferably, the functional monomer has the structure represented by the following chemical formula:

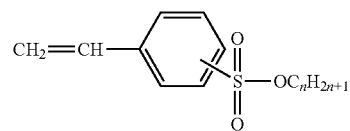

where n is an integer of 1 to 7. In this case, the alkyl sulfonate groups as graft side chains need only to be hydrolyzed at high temperature in order that they are converted to sulfonic acid groups, so the conventional step of sulfonation with conc. sulfuric acid, fuming sulfuric acid or chlorosulfonic acid can be obviated. As a result, the sulfonation reaction of the aromatic rings in the aromatic hydrocarbon-based polymer film substrate can be avoided to ensure that the outstanding mechanical, thermal and chemical characteristics of the film substrate can be retained to the fullest extent. In addition, the use of the esterified monomer enhances the graft polymerizability to the aromatic hydrocarbon-based polymer film substrate, whereby a higher degree of grafting is achieved, namely, graft side chains with a higher content of sulfonic acid groups can be grafted to the aromatic hydrocarbon-based polymer film substrate. Specific examples of such functional monomer include styrenesulfonic acid, sodium styrenesulfonate, and styrenesulfonic acid esters. Among these, styrenesulfonic acid esters are preferred, as exemplified by methyl styrenesulfonate and ethyl styrenesulfonate. Note that these functional monomers may be used alone or in admixture of two or more species.

(Crosslinking Agent)

In the present invention, the above-described monomers, namely, the vinyl monomer to be used in the first graft polymerization step and/or the functional monomer to be used in the second graft polymerization step, in particular, the functional monomer to be used in the second graft polymerization step may be combined with a crosslinking agent that is a monomer having a polyfunctional group (i.e., a polyfunctional monomer) and which is added to the monomer reaction solution in a weight ratio of no more than 10% so as to crosslink the graft chains. If more than 10% of the polyfunctional monomer is added, there is a likelihood for the graft polymerizability to drop or for the resulting polymer electrolyte membrane to become brittle. A preferred example of the monomer having a polyfunctional group (i.e., polyfunctional monomer) is a polyfunctional vinyl monomer. One or more polyfunctional monomers may be used as crosslinking agents. By adding the polyfunctional monomer, in particular, a polyfunctional vinyl monomer to the functional monomer reaction solution, crosslinking can be established between graft side chains having sulfonic acid groups. As a result, loss of sulfonic acid groups from within the polymer electrolyte membrane can be suppressed and the resulting polymer electrolyte membrane is expected to have high chemical stability.

Examples of the above-mentioned polyfunctional monomer (preferably the polyfunctional vinyl monomer) include divinylbenzene, 1,2-bis(p-vinylphenyl)ethane, divinylsulfone, ethylene glycol divinyl ether, diethylene glycol divinyl ether, triethylene glycol divinyl ether, cyclohexane dimethanol divinyl ether, phenylacetylene, diphenylacetylene, 2,3-diphenylacetylene, 1,4-diphenyl-1,3-butadiene, diallyl ether, 2,4,6-triallyloxy-1,3,5-triazine, triallyl-1,2,4-benzenetricarboxylate, triallyl-1,3,5-triazine-2,4,6-trione, etc.

(Characteristics of the Polymer Electrolyte Membrane)

In the polymer electrolyte membrane of the present invention, the degree of grafting of the functional monomer in the second graft polymerization step can be adjusted to control the amount of sulfonic acid groups to be introduced, namely, the ion-exchange capacity. To obtain appropriate levels of ion-exchange capacity and water content, the degree of grafting of the functional monomer in the second graft polymerization step is preferably adjusted to 20% or more, especially 30% or more. To provide the polymer electrolyte membrane with appropriate levels of such properties as tensile strength, elongation, gas impermeability, attachment to electrodes, and oxidation resistance, the degree of grafting is desirably adjusted not to exceed 100%, preferably not to exceed 70%, and more preferably not to exceed 50%.

In the polymer electrolyte membrane of the present invention, it is also preferred that the degree of grafting in the first graft polymerization step involving the graft polymerization of the vinyl monomer is from 1 to 20%, that the degree of grafting in the second graft polymerization step involving the graft polymerization of the functional monomer is from 6 to 80%, and that the ion-exchange capacity is from 0.8 to 3.0 meq/g, in particular, from 0.8 to 2.5 meq/g. The graft chains of the vinyl monomer that have been introduced in the first graft polymerization step will function as scaffolds for graft polymerizing the functional monomer in the second graft polymerization step and the degree of their grafting suffices to be in the range of 1 to 20%. A higher degree of grafting may potentially impair the mechanical strength or the chemical and thermal characteristics of the polymer electrolyte membrane. If the degree by which the functional monomer having sulfonic acid groups or functional groups capable of conversion to sulfonic acid groups are grafted is adjusted to lie between 6 and 80%, the resulting polymer electrolyte membrane has an ion-exchange capacity of from 0.8 to 2.5 meq/g to thereby realize the characteristics required by commercial polymer electrolyte fuel cells. Considering the aforementioned need to provide the polymer electrolyte membrane with appropriate levels of such properties as tensile strength, elongation, gas impermeability, attachment to electrodes, and oxidation resistance, the degree of grafting in the second graft polymerization step which involves graft polymerizing the functional monomer is more preferably adjusted to lie between 20 and 70%; the degree of grafting in the first graft polymerization step which involves graft polymerizing the vinyl monomer is more preferably adjusted to lie between 5 and 15%.

To state more specifically, in order to provide the polymer electrolyte membrane with proton conductivity, its ion-exchange capacity is preferably adjusted to at least 0.8 meq/g, more preferably to at least 1.2 meq/g. To suppress the dimensional change of the polymer electrolyte membrane and ensure that it keeps an adequate level of strength, the ion-exchange capacity of the polymer electrolyte membrane is preferably adjusted to 3.0 meq/g or less, more preferably 2.5 meq/g or less, and even more preferably 2.0 meq/g or less. Hence, it is particularly preferred that the polymer electrolyte membrane has an ion-exchange capacity in the range from 0.8 to 2.5 meq/g.

The polymer electrolyte membrane of the present invention preferably has as a proton conductivity of 0.01 Scm$^{-1}$ or higher at 25° C., with values of 0.1 Scm$^{-1}$ or higher being more preferred. If the proton conductivity at 25° C. is less than 0.01 Scm$^{-1}$, the membrane presents an unduly great resistance and the device such as a fuel cell that installs it will not be able to exhibit adequate performance.

One may want to reduce the thickness of the polymer electrolyte membrane in order to increase its proton conductivity. However, a thin polymer electrolyte membrane will break easily and commonly used polymer electrolyte membranes have thicknesses in the range from 20 μn to 200 μm. If the polymer electrolyte membrane is to be used in a fuel cell, its thickness is adjusted to lie between 10 μm and 200 μm, preferably between 20 μm and 100 μm.

The thus obtained polymer electrolyte membrane for use in fuel cells far excels the conventional membranes in terms of tensile strength and flexibility and it also has high proton conductivity; in addition, when combined with gas-diffusing electrodes, it presents a comparatively low value in overall cell resistance; what is more, it can be produced at a much lower cost than Nafion® which is commercially available from Du Pont. As a further advantage, the polymer electrolyte membrane of the present invention excels in mechanical strength and, hence, in dimensional stability.

(Fuel Cell)

The fuel cell according to the third aspect of the present invention has the above-described polymer electrolyte membrane sandwiched between the fuel electrode and the air electrode. The fuel and air electrodes may be composed of known materials to have known configurations and the fuel cell may also be designed to have a known configuration. The fuel cell of the present invention may adopt any design and configuration in all components other than the polymer electrolyte membrane.

On the following pages, the present invention is described in greater detail by reference to Examples and Comparative Examples, to which the present invention is by no means limited.

Example 1

A film of polyetheretherketone (PEEK) (the aromatic hydrocarbon-based polymer product of Victrex; Victrex APTIV™ Film 2000 Series) was used as a substrate. This substrate was 50 μm thick, 100 mm wide, and 200 mm long.

To perform the first graft polymerization step, divinylbenzene (DVB) (80% isomer mixture manufactured by Wako Pure Chemical Industries, Ltd.) was mixed with 1,4-dioxane at a ratio of 25:75 (in vol %) and the resulting mixed solution was used as the reaction solution. The above-mentioned substrate PEEK film was immersed in this reaction solution, which was purged of the air by flowing the inert gas argon at ordinary temperatures for 20 minutes. Then, thermal graft polymerization was performed at 50° C. for 20 hours. The substrate with the resulting graft chains was dried by heating at 80° C. for 80 hours.

To determine the degree of grafting in the first graft polymerization step (which is hereinafter sometimes referred to as "degree of grafting 1"), the dry weight ($W_g$) of the substrate after the first graft polymerization step was measured and the difference from the weight of the substrate ($W_0$) before the reaction was taken and substituted into the following equation:

Degree of grafting 1(%)=($W_g-W_0$)/$W_0$×100

To perform the second graft polymerization step, the PEEK film to which DVB had been grafted in the first graft polymerization step was irradiated with γ-rays from cobalt 60 in argon gas at ordinary temperatures (irradiation step). The dose of irradiation with γ-rays was 15 kGy. The γ-irradiated film to which DVB had been grafted was used as a substrate for the second graft polymerization step. The reaction solution was prepared by mixing ethyl styrenesulfonate (ETSS) of TOSOH CORPORATION (CAS No.: 16736-98-4) with dioxane at a ratio of 25:75 (vol %). The reaction solution was purged of the air by preliminarily flowing the inert gas argon at ordinary temperatures for 20 minutes. The irradiated PEEK film to which DVB had been grafted was immersed in the reaction solution and subjected to graft polymerization at 80° C. for 16 hours in the argon atmosphere. The grafted film was recovered from the reaction solution, washed with the solvent toluene, and dried by heating at 80° C. for 8 hours. To determine the degree of grafting in the second graft polymerization step (which is hereinafter sometimes referred to as "degree of grafting 2"), the dry weight ($W_{gg}$) of the substrate after the second graft polymerization step was measured and the difference from the weight of the substrate ($W_g$) before the reaction was taken and substituted into the following equation:

Degree of grafting 2(%)=$(W_{gg}-W_g)/W_g \times 100$

Subsequently, the graft film was immersed in ion-exchanged water at 95° C. for 24 hours (hydrolysis step).

The aromatic hydrocarbon-based polymer electrolyte membrane thus prepared from the substrate PEEK film was evaluated for its five characteristics, ion-exchange capacity (meq/g), water content (%), proton conductivity (S/cm), tensile strength on dry membrane (MPa), and tensile strength on hydrous membrane (MPa). The respective characteristics were measured by the following methods.

(1) Ion-Exchange Capacity (meq/g)

The ion-exchange capacity (IEC) of the polymer electrolyte membrane is expressed by the following equation:

IEC=$n/W_m$ n: the amount of sulfonic acid groups (meq) in the polymer electrolyte membrane $W_m$: the dry weight (g) of the polymer electrolyte membrane.

For n measurement, the polymer electrolyte membrane was immersed in 1 M aqueous sulfuric acid at 50° C. for 4 hours until it was thoroughly converted to a proton form (H form); thereafter, the membrane was washed with deionized water to pH=6 to 7 and the free acid was thoroughly removed; then, the membrane was immersed in a saturated aqueous NaCl solution for 24 hours to perform ion-exchange for releasing proton H$^+$; subsequently, the electrolyte membrane and its aqueous solution were subjected to neutralization titration with 0.02M NaOH; the amount of sulfonic acid groups in the polymer electrolyte membrane, n, was determined as the amount of proton H$^+$ which was calculated by 0.02×V (V: the volume in ml of 0.02M NaOH used in titration).

(2) Water Content (%)

A H-form of polymer electrolyte membrane as preserved in water at 80° C. was recovered and after lightly wiping off the water on the surface, the hydrous weight ($W_w$) of the membrane was measured. After vacuum-drying the polymer electrolyte membrane at 60° C. for 16 hours, its dry weight ($W_d$) was measured and $W_w$ and $W_d$ were substituted into the following equation to calculate the water content in it:

Water content=$100(W_w-W_d)/W_d$.

(3) Proton Conductivity (S/cm)

A H-form of polymer electrolyte membrane as preserved in water at room temperature for 24 hours was recovered, sandwiched between Pt electrodes, and subjected to resistance measurement by the impedance method. The proton conductivity of the polymer electrolyte membrane was calculated by the following equation:

κ=$d/(Rm \cdot S)$

κ: the proton conductivity (S/cm) of the polymer electrolyte membrane d: the distance (cm) between the two Pt electrodes Rm: the resistance (Ω) of the polymer electrolyte membrane S: the cross-sectional area (cm$^2$) of the proton flow through the polymer electrolyte membrane during resistance measurement.

(4) Mechanical Strength

To evaluate the mechanical strength of the polymer electrolyte membrane, its tensile strength (MPa) was measured on a dumbbell-shaped test piece at room temperature (25° C.) in accordance with JIS K 7127 in either a dry or hydrous state.

The results of the respective measurements are shown in Table 1.

Example 2

The procedure of Example 1 was repeated, except that in the second graft polymerization step, divinylbenzene (80% isomer mixture manufactured by Wako Pure Chemical Industries, Ltd.) was added as a crosslinking agent to the graft reaction solution. Thus, the graft reaction solution used in the second graft polymerizations step consisted of ethyl styrenesulfonate, divinylbenzene and dioxane at a ratio of 24:1:75 (in vol %). The characteristics of the thus obtained polymer electrolyte membrane were measured and evaluated as in Example 1. The results are shown in Table 1.

Example 3

The procedure of Example 1 was repeated, except that in the first graft polymerization step, styrene was substituted for DVB as the vinyl monomer. Thus, the graft reaction solution to be used in the first graft polymerization step consisted of styrene and dioxane at a ratio of 25:75 (vol %). The characteristics of the thus obtained polymer electrolyte membrane were measured and evaluated as in Example 1. The results are shown in Table 1.

Comparative Example 1

A polymer electrolyte membrane was prepared by a process that was completely identical to the procedure of Example 1, except that the first graft polymerization step was omitted and that the second graft polymerization step was immediately performed. The characteristics of the thus obtained polymer electrolyte membrane were measured and evaluated as in Example 1. The results are shown in Table 1.

Comparative Example 2

A polymer electrolyte membrane was prepared by repeating the procedure of Example 1, except that the first and second graft polymerization steps were omitted and that polyetheretherketone (PEEK) was directly sulfonated by a conventional method. To state specifically, 1 g of polyetheretherketone (PEEK) was dissolved in 50 g of 96% conc. sulfuric acid and subjected to sulfonation reaction at room temperature for 240 hours. Thereafter, the reaction solution was poured into 200 g of iced water, whereupon the sulfonated PEEK was precipitated. A hundred milligrams of the separating sulfonated PEEK was dissolved in 2 g of a DMSO solution at 80° C. and the solution was cast on a glass plate to prepare a sulfonated PEEK electrolyte membrane. The characteristics of the thus obtained polymer electrolyte membrane were measured and evaluated as in Example 1. The results are shown in Table 1.

Comparative Example 3

The characteristics of Nafion® 112 of Du Pont were measured and evaluated as in Example 1. The results are shown in Table 1.

(Results of Evaluation)

The results of evaluation in Examples 1 to 3 and Comparative Examples 1 to 3 are shown in Table 1.

TABLE 1

|  | Degree of grafting 1 in the first step (%) | Degree of grafting 2 in the second step (%) | Ion-exchange capacity (meq/g) | Proton conductivity (S/cm) | Degree of water saturation (%) | Tensile strength of dry membrane (MPa) | Tensile strength of water-saturated membrane (MPa) |
|---|---|---|---|---|---|---|---|
| Ex. 1 | 13.1 | 53.1 | 1.89 | 0.109 | 43.0 | 63.0 | 53.7 |
| Ex. 2 | 13.1 | 47.2 | 1.74 | 0.099 | 31.0 | 75.9 | 61.4 |
| Ex. 3 | 9.0 | 30.2 | 1.26 | 0.051 | 33.9 | 55.3 | 46.3 |
| C. Ex. 1 | 0 | 16.0 | 0.75 | 0.008 | 20.3 | — | — |
| C. Ex. 2 | — | — | 1.59 | 0.053 | 178.8 | 32.6 | 6.72 |
| C. Ex. 3* | — | — | 0.91 | 0.060 | 30.0 | 33.8 | 26.3 |

*Nafion membrane

In Comparative Example 1, the first graft polymerization step was omitted and only the second graft polymerization step in the procedure of Example 1 was employed; in other words, the polymer electrolyte membrane was produced by the conventional radiation-induced graft polymerization process. Since the graft polymerizability of the functional monomer to the aromatic hydrocarbon-based polymer PEEK film was low, the degree of grafting of the functional monomer that could be achieved in Comparative Example 1 was by far smaller than in Examples 1 to 3. The grafting conditions in Comparative Example 1, such as the dose of irradiation, the temperature for graft polymerization and the time of graft polymerization, were adjusted in various ways but the maximum degree of grafting that could be achieved on the above-described aromatic hydrocarbon-based polymer film was no more than 20%. Because of the low degree of grafting that could be achieved on it, the proton conductivity of the resulting polymer electrolyte membrane was almost comparable to that of an insulator and the membrane had no potential for application in polymer electrolyte fuel cells.

In Comparative Example 2, the polymer electrolyte membrane was produced by the direct sulfonation step and the membrane forming step in the conventional manner. Since the sulfonic acid groups were directly bonded to the aromatic rings in the film substrate, the characteristics of the substrate polymer were greatly affected. Consequently, although the polymer electrolyte membrane obtained had ion-exchange capacity and proton conductivity values that were comparable to the levels achieved in Examples 1 to 3, the degree of water saturation in it was greater than 100%. Thus, the dimensional stability of the polymer electrolyte membrane of Comparative Example 2 so much deteriorated upon drying and water absorption that it would easily break under the operation conditions of a fuel cell.

Comparative Example 3 was performed to show the characteristics of the conventional Nafion® electrolyte membrane. As can be seen from the results of evaluation shown in Table 1, the polymer electrolyte membranes of Examples 1 to 3 showed proton conductivities and degrees of water saturation that were either comparable to or higher than the values exhibited by the Nafion® electrolyte membrane. In particular, the mechanical strength values (tensile strength of dry membrane and that of water-saturated membrane) of the aromatic hydrocarbon-based polymer electrolyte membranes prepared in Examples 1 to 3 were more than double the values for the Nafion® electrolyte membrane.

In Examples 1 to 3, the sulfonic acid groups in the polymer electrolyte membrane were converted from the ethyl sulfonate groups in the functional monomer by means of hydrolysis; the same result can be obtained by another functional monomer such as sodium sulfonate with protonation. If desired, sulfonic acid groups may be directly introduced into graft chains using a functional monomer having sulfonic acid groups.

In the present invention which is based on the graft polymerization technology, an aromatic hydrocarbon-based polymer film which is in the class of super-engineering plastics is used as a substrate which undergoes two stages of graft polymerization to produce a polymer electrolyte membrane having high mechanical strength and proton conductivity; the present invention also provides a process for producing this polymer electrolyte membrane, thus contributing to an increased use of polymer electrolyte fuel cells. The highly proton-conductive, polymer electrolyte membrane of the present invention which excels in mechanical strength is suitable for use not only in fuel cells but also in other applications including water electrolysis, sodium chloride electrolysis, oxygen concentrators, humidity sensors, and gas sensors.

What is claimed is:

1. A polymer electrolyte membrane produced by a process having a two-step graft polymerization, the two-step graft polymerization comprising:
    a first graft polymerization wherein a vinyl monomer is graft polymerized to an aromatic polymer film substrate; and
    a second graft polymerization wherein a functional monomer represented by the following formula and having functional groups capable of conversion to sulfonic acid groups is introduced into the resulting graft chains on the aromatic polymer film substrate:

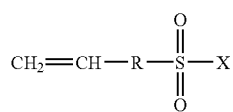

where R is an aromatic ring or an aliphatic chain, and X is $-OC_nH_{2n+1}$ where n is an integer of 1 to 7.

2. The polymer electrolyte membrane according to claim 1, wherein the vinyl monomer and/or the functional monomer is combined with one or more polyfunctional monomers as a crosslinking agent to form a crosslinked structure.

3. The polymer electrolyte membrane according to claim 1, wherein the aromatic polymer film substrate is a polyetheretherketone film.

4. The polymer electrolyte membrane according to claim 1, wherein the first graft polymerization of the vinyl monomer and the second graft polymerization of the functional monomer are performed by a thermal graft polymerization or a radiation-initiated graft polymerization.

5. The polymer electrolyte membrane according to claim 1, wherein the degree of the first graft polymerization of the vinyl monomer is from 1 to 20%, the degree of the second graft polymerization of the functional monomer is from 6 to 80%, and the ion-exchange capacity of the resulting polymer electrolyte membrane is from 0.5 to 3.0 meq/g.

6. A polymer electrolyte fuel cell wherein the polymer electrolyte membrane according to claim 1 is provided between two gas-diffusing electrodes.

7. The polymer electrolyte membrane according to claim 2, wherein the aromatic polymer film substrate is a polyetheretherketone film.

8. The polymer electrolyte membrane according to claim 2, wherein the first graft polymerization of the vinyl monomer and the second graft polymerization of the functional monomer are performed by a thermal graft polymerization or a radiation-initiated graft polymerization.

9. The polymer electrolyte membrane according to claim 3, wherein the first graft polymerization of the vinyl monomer and the second graft polymerization of the functional monomer are performed by a thermal graft polymerization or a radiation-initiated graft polymerization.

10. The polymer electrolyte membrane according to claim 2, wherein the degree of grafting in the first graft polymerization of the vinyl monomer is from 1 to 20%, the degree of grafting in the second graft polymerization of the functional monomer is from 6 to 80%, and the ion-exchange capacity of the resulting polymer electrolyte membrane is from 0.5 to 3.0 meq/g.

11. The polymer electrolyte membrane according to claim 3, wherein the degree of grafting in the first graft polymerization of the vinyl monomer is from 1 to 20%, the degree of grafting in the second graft polymerization of the functional monomer is from 6 to 80%, and the ion-exchange capacity of the resulting polymer electrolyte membrane is from 0.5 to 3.0 meq/g.

12. The polymer electrolyte membrane according to claim 4, wherein the degree of grafting in the first graft polymerization of the vinyl monomer is from 1 to 20%, the degree of grafting in the second graft polymerization of the functional monomer is from 6 to 80%, and the ion-exchange capacity of the resulting polymer electrolyte membrane is from 0.5 to 3.0 meq/g.

13. A polymer electrolyte fuel cell wherein the polymer electrolyte membrane according to claim 2 is provided between two gas-diffusing electrodes.

14. A polymer electrolyte fuel cell wherein the polymer electrolyte membrane according to claim 3 is provided between two gas-diffusing electrodes.

15. A polymer electrolyte fuel cell wherein the polymer electrolyte membrane according to claim 4 is provided between two gas-diffusing electrodes.

16. A polymer electrolyte fuel cell wherein the polymer electrolyte membrane according to claim 5 is provided between two gas-diffusing electrodes.

17. A process of producing a polymer electrolyte membrane having a two-step graft polymerization, the two-step graft polymerization comprising:

a first graft polymerization wherein a vinyl monomer is graft polymerized to an aromatic polymer film substrate; and a second graft polymerization wherein a functional monomer represented by the following formula and having functional groups capable of conversion to sulfonic acid groups is introduced into the resulting graft chains on the aromatic polymer film substrate:

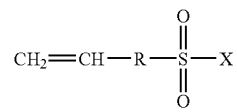

where R is an aromatic ring or an aliphatic chain, and X is $-OC_nH_{2n+1}$ where n is an integer of 1 to 7.

* * * * *

UNITED STATES PATENT AND TRADEMARK OFFICE
CERTIFICATE OF CORRECTION

| | |
|---|---|
| PATENT NO. | : 8,372,558 B2 |
| APPLICATION NO. | : 12/230103 |
| DATED | : February 12, 2013 |
| INVENTOR(S) | : Jinhua Chen et al. |

It is certified that error appears in the above-identified patent and that said Letters Patent is hereby corrected as shown below:

In the Claims

Column 17, Line 2-3, In Claim 3, delete "polyethertherketone" and insert -- polyetheretherketone --, therefor.

Signed and Sealed this
Fourth Day of June, 2013

Teresa Stanek Rea
*Acting Director of the United States Patent and Trademark Office*